May 26, 1942.  L. F. MOODY  2,284,295
ROTARY HYDRAULIC MACHINE
Filed Oct. 19, 1939  2 Sheets—Sheet 2
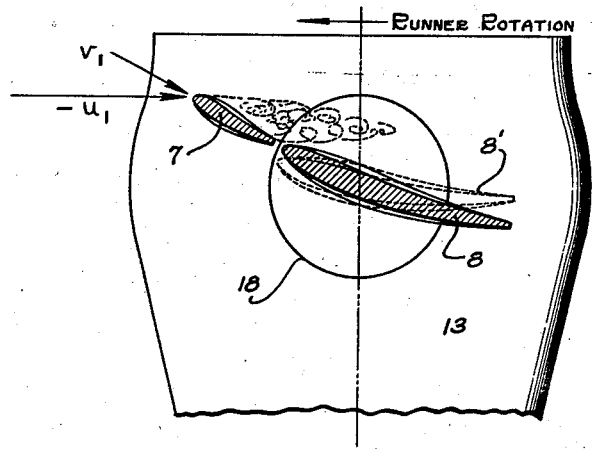
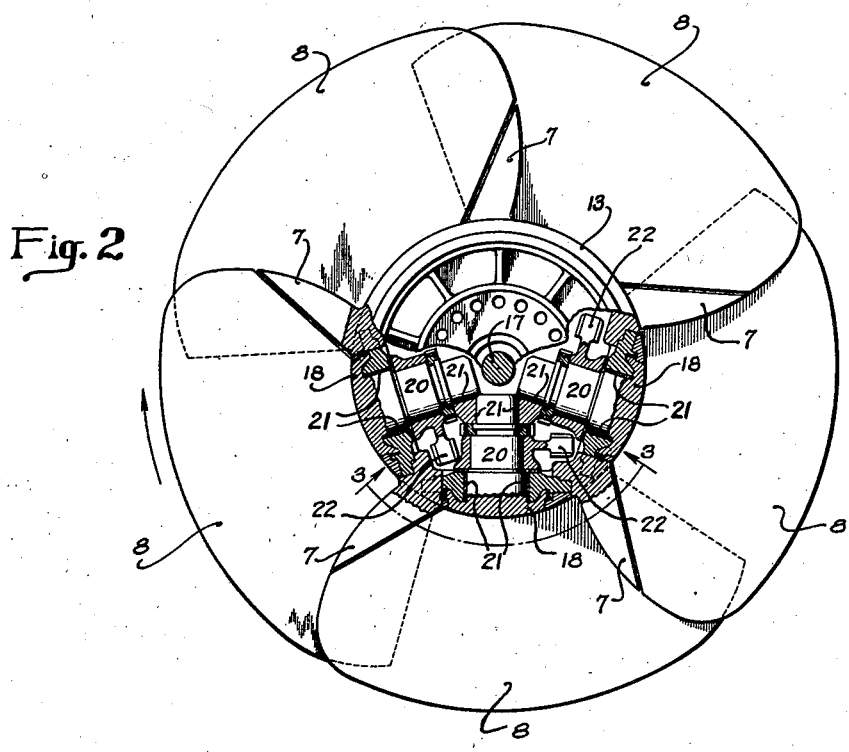
INVENTOR
LEWIS FERRY MOODY
BY
ATTORNEY Patented May 26, 1942

2,284,295

UNITED STATES PATENT OFFICE 2,284,295

ROTARY HYDRAULIC MACHINE

Lewis Ferry Moody, Princeton, N. J., assignor, by mesne assignments, to The Baldwin Locomotive Works, a corporation of Pennsylvania Application October 19, 1939, Serial No. 300,160

10 Claims. (Cl. 253—148)

This invention relates generally to rotary hydraulic machines such as hydraulic turbines and hydraulic pumps, and more particularly to such machines of the propeller type having angularly adjustable runner blades.

In propeller turbines of the usual type having adjustable runner blades movable as a whole, the angular change of every portion of the blade is necessarily the same, whereas the vector diagrams of the flow velocities show that the angles at entrance and discharge should be adjusted to different degrees to preserve maximum efficiency. Thus the inlet angles of the blades should be adjusted to a smaller degree than the outlet angles; and at small blade openings when the turbine is operating at constant speed and reduced load the ideal form would be one which could be given greater curvature and thus be made to deflect the flow to a greater extent than at normal position. This discrepancy between the desired blade angles and those angles provided by adjustment of the blade as a whole is greatest near the runner hub where the radial distance from the axis of rotation is least.

Aside from the effect on the performance at normal speed, my invention has a direct bearing on another factor which in many installations may be of even greater importance, namely, the effect on the runaway speed of the unit. The so-called Kaplan type of turbine, having simultaneously adjustable runner blades and guide vanes, has the valuable property of being able to maintain large output under reduced head operation, as in time of flood, this being accomplished by opening the guide vanes and runner blades beyond their positions for maximum efficiency, thus enlarging the passages to discharge greatly increased flow. On the other hand, an unwelcome accompaniment of this flexibility of operation is that if the turbine governor should fail to close the guide vanes and runner blades when the load is taken off the generator, the turbine will reach a high runaway speed considerably more than double its normal speed and hence the rotating parts of both turbine and generator must be made heavier and stronger to provide for this contingency. If the usual governor or control valve mechanism should fail and allow the runner blades to go to a partially closed position while leaving the guide vanes wide open, very high runaway speeds are possible. In turbines having fixed guide vanes and adjustable runner blades this possibility of reaching very high runaway speeds always exists.

It is one object of my invention to provide an adjustable blade rotary hydraulic machine having an improved blade arrangement adapted to direct and control in an improved manner the fluid flow through the machine in order to obtain more desirable operating characteristics approaching those of the ideal form of blade; thereby improving the operation and efficiency of an adjustable blade turbine at normal speed under loads differing from normal output.

Another object is to provide an improved blade arrangement for effecting a reduction in runaway speed of an adjustable blade turbine and particularly in a Kaplan type turbine.

A further object is to provide an improved blade arrangement in an adjustable blade hydraulic machine whereby the flow distribution in the unit is controlled in a manner contributing to reduction in the tendency toward cavitation.

A more specific object of my invention is to provide an improved blade arrangement in an adjustable blade propeller machine whereby at small blade openings the flow is deflected to a greater extent with better efficiency than has been possible with blade arrangements heretofore used.

A further object is to provide an improved blade arrangement in an adjustable blade propeller type machine that will accomplish all of the foregoing objects in a manner that is relatively simple and economical in construction, operation and maintenance while at the same time providing a blade structure that has a high degree of stability, ruggedness and dependability.

In accomplishing the foregoing objects as well as others which will occur to those skilled in the art, I have specifically separated from the major portion of the blade a part of each blade along the inlet edge extending outward from the hub to a point intermediate between the hub and outer blade periphery, this separated portion forming a subsidiary blade of approximately triangular shape widest at the hub and tapering in width to its outer end. Each subsidiary blade instead of being turned with the main blade for angular adjustment is fixed to the hub so that its angular direction remains constant. It is then at less variance with the relative direction of flow for constant speed of the turbine than if it were turned with the main portion of the runner blade. Such an arrangement is conducive to minimizing the impairment of efficiency which arises in those turbines having both adjustable guide vanes and adjustable runner blades wherein only small loss of efficiency usually occurs with moderate variation of load but which loss becomes relatively large at small loads; and this possible improvement is still more substantial when fixed guide vanes are used with my improved runner blades.

As to controlling the runaway speed according to my invention, when the runner blades are adjusted toward their closed position the subsidiary blades or blade portions retain their normal fixed position relative to the runner hub, this position being particularly adapted for operation only at normal speed. Therefore, when the turbine attempts greatly to exceed this speed the subsidiary blades are not adjusted to suit the greater speed and hence they must be forced through the water at a considerable angle of obliquity to the flow and consequently act like brakes to limit the speed of the runner.

On the other hand, in adjustable blade propeller pumps, which may be considered herein to be of the type shown in my Patent No. 1,978,809 but provided with the improved runner hereof, the fixed blade portions or subsidiary blades provide a means for modifying the form of the operating curve of head versus discharge to suit the characteristics desired in particular installations. For example, if it is desired to maintain good efficiency over a wide range of discharges and also to provide for a considerable increase in head at zero discharge, the provision of the fixed blade portion offers the possibility of obtaining very desirable characteristics intermediate between those of fixed runner blade and movable runner blade propeller pumps.

As disclosed herein, my invention is applicable to the various usual types of turbines having adjustable runner blades and fixed guide vanes; and to pumps having adjustable runner blades and fixed diffusion vanes at discharge; or to turbines having volute intakes without guide vanes; and to pumps having volute discharge casings without diffusion vanes, all as respectively shown in Patents 1,919,376, 2,064,313 and 2,010,555 whose disclosures are to be considered as a part hereof with my improved runner substituted therein.

Other objects and advantages will be more apparent to those skilled in the art from the following description of the accompanying drawings in which:

Fig. 2 is a plan view of the runner of Fig. 1 with a portion of the hub broken away to show a part of the blade adjusting means in horizontal section;

Fig. 3 is a diagrammatic representation of a developed cylindrical section along the line 3—3 of Fig. 2 unrolled in a plane to indicate the flow conditions at the subsidiary blades.

Figure 1:
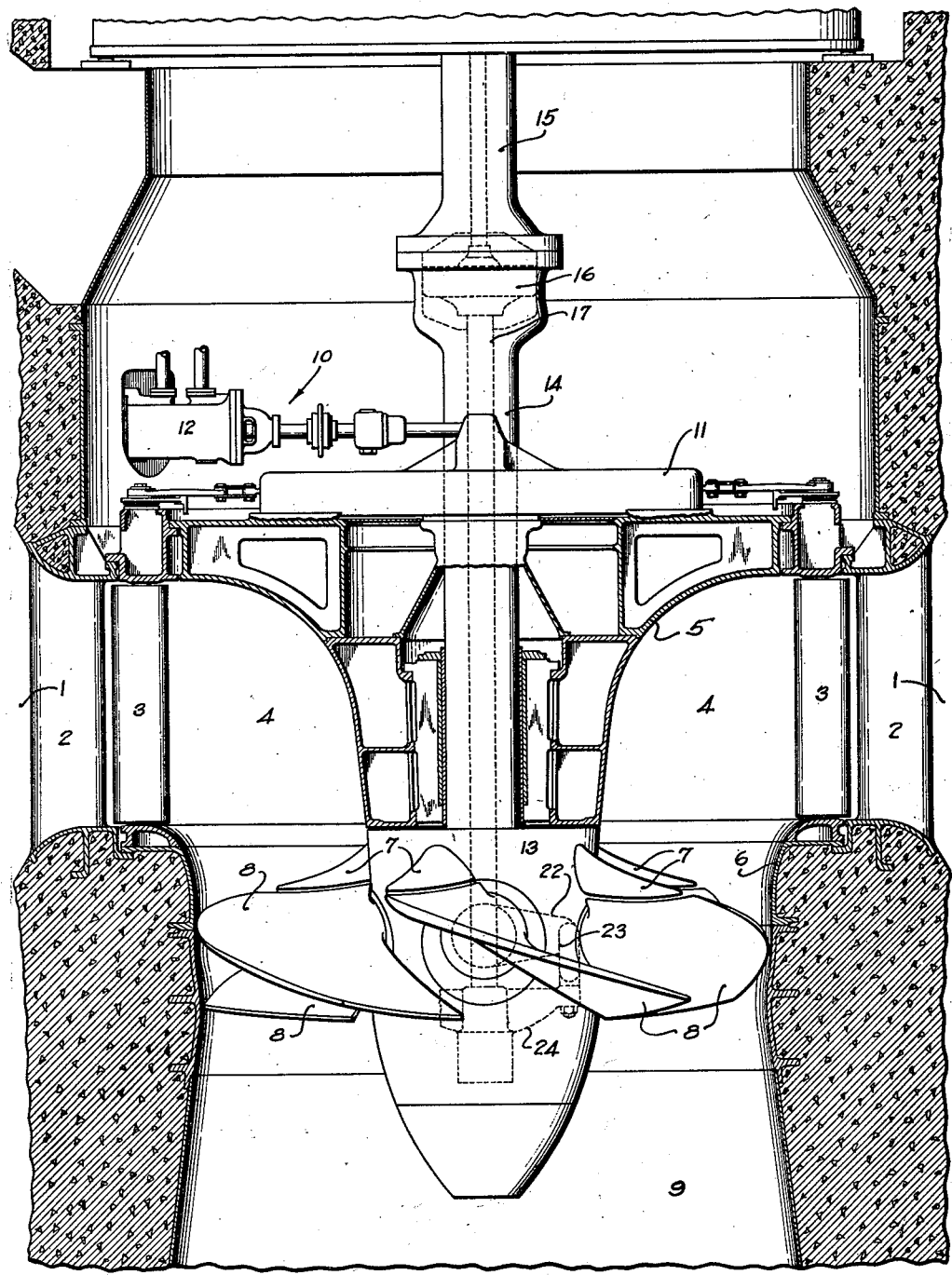
Fig. 1 is a fragmentary sectional elevation of a turbine incorporating my invention, the runner being shown in side elevation.

In Fig. 1 the water flows from a suitable inlet or casing partially indicated at 1 and thence inwardly between a series of usual circumferentially spaced stay vanes 2 and movable guide vanes or wicket gates 3 into a transition space 4 formed by a usual head cover 5 and throat ring 6. The guide vanes whirl the water entering the transition space whose walls 5 and 6 axially turn the flow through channels formed between successive subsidiary blades 7 and main blades 8 of the runner, the water finally discharging through any usual and suitable draft tube 9. The guide vanes 3 are rotatably adjustable by any usual operating mechanism generally indicated at 10 which includes gate arms and links and a shifting ring 11 connected to an operating servo-motor 12. Inasmuch as these elements are well-known in the art, further detailed description thereof is not necessary. The subsidiary blades 7 are rigidly fixed to a runner hub 13 or they may be integrally cast therewith and the main blades 8 are adjustably supported by the hub in any usual and well-known manner to be generally described hereafter. The hub forms a smooth continuation of the wall 5 and is supported by and rigidly secured to a turbine shaft 14 which is bolted to a generator shaft 15. The shaft 14 is hollow and contains a reciprocable operating piston 16 and a piston rod 17 extending through the hollow interior of shaft 14. This rod is connected through usual arms and links disposed within the hub which will be described presently thereby rotatably to adjust the main blades 8 concurrently with the adjustment of the guide vanes 3. This concurrent control is for regulating the power output of the unit and is effected by a usual type of governor (not shown) which may be considered herein to be the same as shown in my Patent 2,010,555.

In Fig. 2 the main blades 8 are shown with integrally formed circular bosses 18 having shanks or spindles 20 rotatably supported in bearings 21 formed in the hub 13. Keyed to the spindles 20 are cranks or levers 22 (shown dotted in Fig. 1) which are connected by usual links 23 and crosshead 24 to the lower end of operating rod 17. The subsidiary blades 7 are shown in Fig. 3 integrally cast with the hub 13 but when preferred, as in larger units, they can be separately formed and then attached to the hub by suitable means.

The operation will be more apparent from Fig. 3 which shows a developed section through a single main blade and its cooperating subsidiary blade, the section being taken in the general line of flow. The other blades are omitted and the hub 13 and the circular boss 18 are shown in elevation behind the partial section. The main blade 8, as shown by the solid lines, is in normal position, or approximately in the adjustment for maximum efficiency and normal load. The dotted position 8' of the main blade shows it in closed or nearly closed position.

When in normal position, the main blade 8 and subsidiary blade 7 are substantially aligned to form a nearly continuous contour giving substantially the same effect as a single blade unit incorporating the two, it being noted, however, that the subsidiary and main blades are each provided with a relatively large rounded leading edge and that in cross-section each such blade tapers in the direction of flow thereover. While in general the subsidiary and main blades, when in alignment, form in effect a single blade, yet the tapering section of the subsidiary blade allows its trailing edge to direct the flow against the larger leading edge of the main blade. This has the advantage of minimizing cavitation effects along the adjacent edges of the main and subsidiary blades when they are either in alignment or relatively displaced from each other.

In the above described aligned position, at normal speed of the turbine, the flow approaches the combined blade with the relative velocity $v_1$, and the subsidiary portion of the blade has a direction at its entrance and conforming to the direction of $v_1$. The two portions of the blade acting as one gradually deflect this flow much as in the turbine of the prior art. It will be understood by those familiar with the art that if the relative velocity $v_1$ is combined vectorially with the velocity $u_1$ of the entrance point of the blade, the third side of the vector triangle (not shown) will represent the actual or absolute velocity of flow. Now suppose the main blades to be adjusted to approximately their closed position indicated by the dotted lines. Under such adjustment the leading edges of the main blades and their subsidiary blades will respectively have entrance angles different from those angles which said main and subsidiary blades have when in alignment with each other. Combined with this angular difference is the fact that a passageway is created between the main blades and their subsidiary blades when out of alignment with each other. Under such conditions of non-alignment there will now be very little flow through the turbine and the absolute velocity of the water will be practically zero. Hence the relative velocity with which the water impinges on the blades will be the linear velocity of the blade but reversed in direction, or $-u_1$ as indicated in the figure. This will produce a region of eddies behind the subsidiary blade which is no longer disposed in the relative direction of fluid motion, and will build up a considerable pressure difference on the two sides of this blade imposing a torque or braking action on the runner opposing its motion. If there is no load on the generator or driven machine, this will greatly increase the resisting torque which otherwise would consist only of windage and friction of the unit. A comparatively small increase in resisting torque is sufficient to cause a substantial reduction in the runaway speed; and since the centrifugal stresses in the rotating parts vary as the square of the speed, an important saving in the cost of the turbine and particularly of the generator can be effected, or a greater margin of safety against serious accident can be secured.

One of the principal objects of the invention will thus be seen to be the modification of the operating characteristics of an adjustable blade turbine or pump; and specifically the reduction in runaway speed of an adjustable blade turbine and an improvement of its operation at normal speed under loads differing from normal output. At large gate openings the subsidiary blades may also modify the flow distribution in a manner contributing to a reduction of the tendency toward cavitation.

It will of course be understood that various changes in details of construction and arrangement of parts may be made by those skilled in the art without departing from the spirit of the invention as set forth in the appended claims.

I claim:

1. A rotary hydraulic machine comprising, in combination, means forming a flow passage, and a propeller type runner therein having a hub provided with a plurality of main blades pivotally adjustable about axes disposed at an angle to the axis of runner rotation and fixed subsidiary blades disposed respectively adjacent each main blade and in spaced relation thereto to provide a fluid passageway therebetween when the main blade is pivotally adjusted to a predetermined position.

2. A rotary hydraulic machine comprising, in combination, means forming a flow passage, and a propeller type runner therein having a hub provided with a plurality of main blades pivotally adjustable about axes disposed at an angle to the axis of runner rotation and fixed subsidiary blades disposed respectively adjacent each main blade and located at the leading edges of the main blades, said main blades and their subsidiary blades having their leading edges disposed at different angles when in predetermined positions of adjustment and passageways being formed between said main and subsidiary blades during said adjustments.

3. A rotary hydraulic machine comprising, in combination, means forming a flow passage, and a propeller type runner therein having a hub provided with a plurality of main blades pivotally adjustable about axes disposed at an angle to the axis of runner rotation and fixed subsidiary blades disposed respectively adjacent each main blade and located at the leading edges of the main blades, said main blades and their subsidiary blades having their leading edges disposed at different angles when in predetermined positions of adjustment and passageways being formed between said main and subsidiary blades during said adjustments, said subsidiary blades having their widest portion adjacent said hub and tapering therefrom to a point intermediate of the hub and circumference of the main blades.

4. A rotary hydraulic machine comprising, in combination, means forming a flow passage, and a propeller type runner therein having a hub provided with a plurality of main blades pivotally adjustable about axes disposed at an angle to the axis of runner rotation and fixed subsidiary blades disposed respectively adjacent each main blade and in spaced relation thereto to provide a fluid passageway therebetween when the main blade is pivotally adjusted to a predetermined position, said subsidiary blades tapering in the direction of flow thereover.

5. A rotary hydraulic machine comprising, in combination, means forming a flow passage, and a propeller type runner therein having a hub provided with a plurality of main blades pivotally adjustable about axes disposed at an angle to the axis of runner rotation and fixed subsidiary blades disposed respectively adjacent each main blade and in spaced relation thereto to provide a fluid passageway therebetween when the main blade is pivotally adjusted to a predetermined position, the leading edges of said main and subsidiary blades being relatively large and the trailing edges of each of said blades being tapered whereby when the adjacent main and subsidiary blades are in alignment with each other the fluid flows over the subsidiary blades and partially against the leading edges of the main blades.

6. A rotary hydraulic machine comprising, in combination, means forming a flow passage, and a propeller type runner therein having a hub provided with a plurality of blades pivotally adjustable about axes disposed at an angle to the axis of runner rotation and fixed subsidiary blades said subsidiary blades being disposed in spaced relation to their main blades to provide a passageway therebetween during predetermined adjustments of the main blades, said subsidiary blades being adapted during normal speed operation to have maximum cooperative action with the fluid flow and to modify the flow automatically upon occurrence of a predetermined speed in excess of normal thereby to reduce the runaway speed of the runner 7. A rotary hydraulic machine comprising, in combination, means forming a substantially axial flow passage, means for causing whirl of the fluid entering said passage, and a propeller type runner disposed in said passage having a hub provided with a plurality of main blades pivotally adjustable about axes disposed at an angle to the axis of runner rotation and fixed subsidiary blades disposed respectively adjacent each main blade to form a substantially continuous contour thereof in one position of adjustment of the main blades whereby upon adjustment of the main blades to other positions the effective flow surface of each main blade and its subsidiary blade is modified so as to form a passageway therebetween.

8. The combination set forth in claim 7 further characterized by the provision of means for adjustably supporting said main blades about axes normal to the axis of runner rotation.

9. The combination set forth in claim 7 further characterized by the provision of means for variably adjusting the degree of whirl of the flow entering said passage.

10. The combination set forth in claim 7 further characterized in that said main blades are provided with cylindrical discs journalled in said hub, and said subsidiary blades are secured to said hub adjacent the periphery of said discs.

LEWIS FERRY MOODY.